Jan. 15, 1935.  F. MACCARONE  1,988,282

SHOE MAKING METHOD

Filed Dec. 20, 1933  4 Sheets-Sheet 1

INVENTOR
Fred Maccarone
BY
Ashley + Ashley
ATTORNEYS

Jan. 15, 1935. F. MACCARONE 1,988,282
SHOE MAKING METHOD
Filed Dec. 20, 1933 4 Sheets-Sheet 2
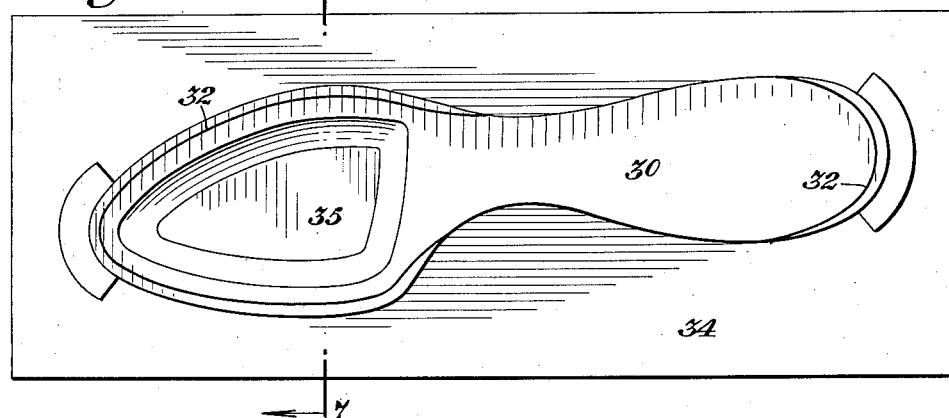
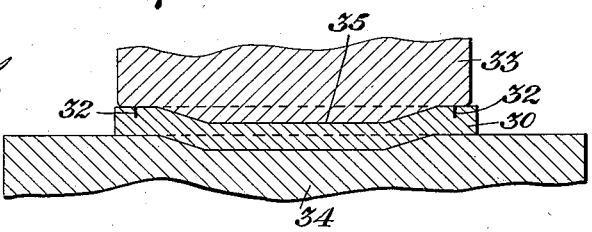
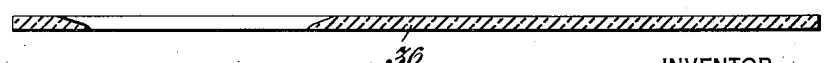
INVENTOR
Fred Maccarone
BY Ashley & Ashley
ATTORNEYS Jan. 15, 1935.  F. MACCARONE  1,988,282
SHOE MAKING METHOD
Filed Dec. 20, 1933  4 Sheets-Sheet 3

INVENTOR
Fred Maccarone
BY
Ashley & Ashley
ATTORNEYS

Jan. 15, 1935.   F. MACCARONE   1,988,282
SHOE MAKING METHOD
Filed Dec. 20, 1933   4 Sheets-Sheet 4
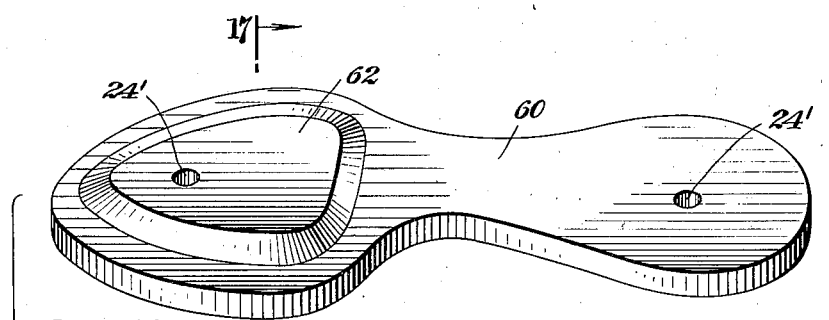
Fig.16.
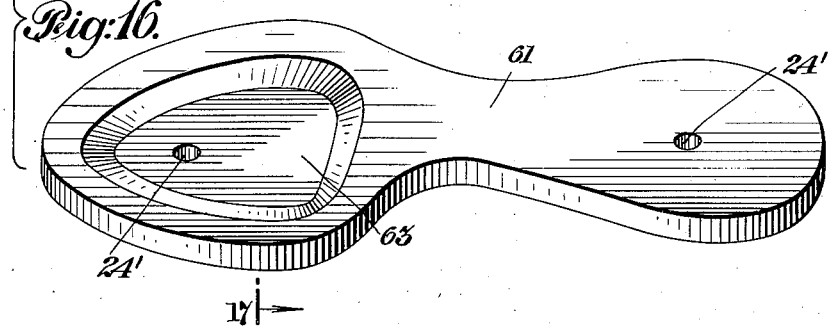
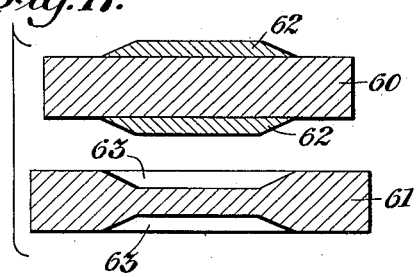
Fig.17.
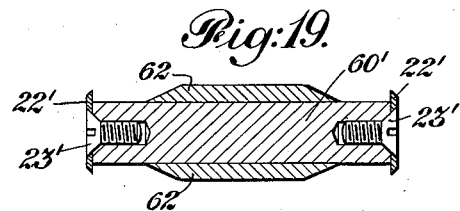
Fig.19.
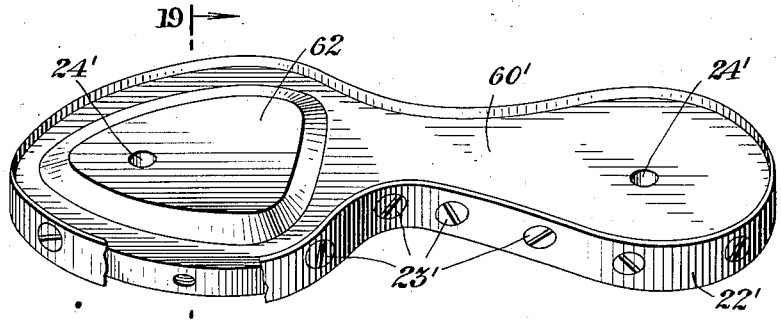
Fig.18.
INVENTOR
Fred Maccarone
BY Ashley & Ashley
ATTORNEYS Patented Jan. 15, 1935

1,988,282

UNITED STATES PATENT OFFICE 1,988,282

SHOE MAKING METHOD

Fred Maccarone, Brooklyn, N. Y.

Application December 20, 1933, Serial No. 703,237

10 Claims. (Cl. 12—146)

My present invention relates to shoe making and is a continuation in part of my copending application No. 671,109 filed May 15, 1933.

A principal object of my invention is to provide an improved and simplified method of making shoes of the type originally taught in my United States Patent No. 1,569,823, wherein an insole, to which the upper is affixed, includes an integral heel portion, a shank portion, and a ball portion having a central opening therein defining a continuous marginal rand extending from the front of one side of the shank around the toe and to the front of the opposite side of the shank to afford means for initially affixing the upper to the insole, and an outsole is provided having a marginal depression conforming to the rand for receiving the same with the upper attached thereto, whereby the central portion of the inner face of the outsole is disposed flush with the upper surface of the rand.

A further principal object is to provide an improved and more economical method of producing an outsole and a complementary insole therefor, whereby the insole and outsole portions of the shoe are patterned and sized at the same time from a single piece of sole material to insure that the insole and outsole portions are of relatively proper shapes and sizes.

Referring to the drawings:

Figure 6 is a plan view of the female portion of a die employed to centrally depress the ball portion of the rounded and incised sole which is shown lying thereon.

Figure 7 is a cross sectional view taken on lines 7—7 of Figure 6 and illustrates, on a larger scale, the ball portion of the sole depressed between the male and female die portions.

Figure 8 is a longitudinal sectional view illustrating the method by which the rounded and incised sole is split to provide the complementary and properly sized outsole and insole portions.

Figure 9 is a longitudinal section thru the insole portion.

Figure 10 is a longitudinal section thru the outsole portion.

Figure 11 is a longitudinal section thru the backing piece employed to support and reinforce the sole during the splitting operation illustrated in Figure 8.

Figure 16 illustrates in perspective improved means for depressing the sole material, comprising a pair of plates between which the sole material may be positioned and clamped in a sole rounding machine, one of said plates comprising a sole rounding pattern.

Figure 17 is a cross sectional view taken on line 17—17 of Figure 16.

Figure 18 is a perspective illustration of a plate, similar to the upper plate shown in Figure 16, contoured to define an insole, and carrying a marginal blade for incising and initially forming an insole as the material is clamped in the rounding machine.

Figure 19 is a sectional view taken on line 19—19 of Figure 18.

In carrying out my present invention I prefer to first incise the sole material to define an insole portion of suitable size, thickness and proportions, and then to round the outsole from the same piece of material in relation to the insole thus defined.

Figure 1:
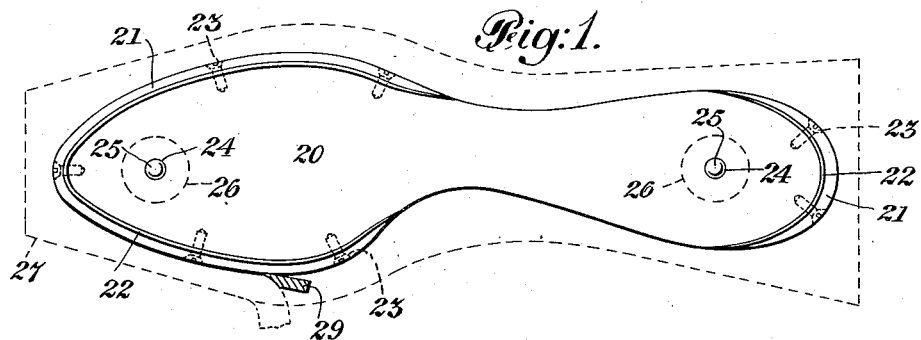
Figure 1 is a plan view of a combination pattern or template and cutting die for rounding an outsole and initially forming an insole for use therewith.

To accomplish this I may employ a pattern or template, as shown in Figure 1, which comprises a body portion 20 and side and end portions 21 and 21, between which I removably secure thin and flexible cutting blades 22—22 by means of countersunk screws 23—23 etc. The blades 22 are positioned and arranged to extend outwardly from the face of the pattern a distance corresponding to the thickness of the insole to be provided and are contoured in conformity with the sole portion of the last on which the shoe is to be assembled.

As indicated in the drawings, it is usually not necessary that the full outline of the insole be incised in the sole material or that the blades 22 extend to accomplish that purpose inasmuch as the insole ordinarily conforms in size and shape to the outsole over the shank and forward portions of the heel and may be formed with the outsole in the sole rounding operation hereafter to be described.

Figures 2, 3:
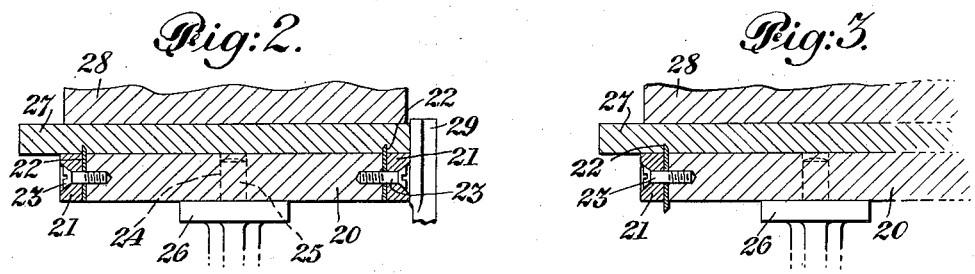
Figure 2 is a cross sectional view on a larger scale of the pattern shown in Figure 1, having a piece of the sole material clamped thereagainst and illustrates the sole rounding operation as well as the initial insole forming operation.
Figure 3 is a fragmental view similar to Figure 2, illustrating a modification of the combination pattern and die.

In all other respects the pattern is of the usual type heretofore employed and is provided with holes therethru at 24 and 24 to receive the positioning pins 25—25 of a conventional sole rounding machine, fragmental supporting parts of which are indicated at 26 in Figures 2 and 3.

When the pattern has been positioned on the sole rounding machine, a piece of sole material 27, of uniform thickness, is laid over the pattern and rests upon the cutting edges of the blades 22, whereupon the clamp 28 of the rounding machine is forced down upon the material, causing the blades 22 to cut into the material and firmly holding the material against the face of the pattern during the rounding operation performed by the knife 29, as indicated in Figures 1 and 2. The rounded sole 30 is then taken from the machine and appears with incisions therein as indicated at 32—32 in Figures 4 and 5.

As illustrated in Figure 3, the blades 22 may be made to extend from both faces of the pattern so that alternate faces thereof may be employed to form the sole portions of a mated pair of shoes.

Figure 4:
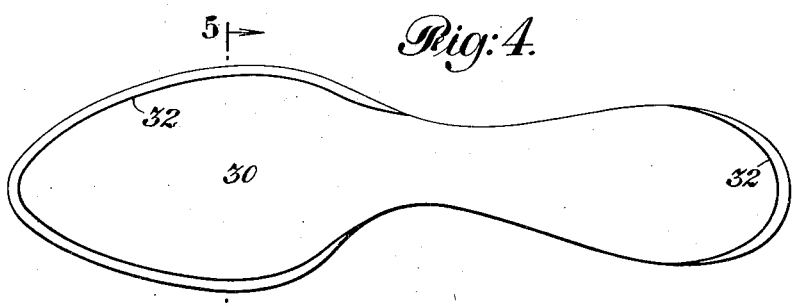
Figure 4 is a plan view of the rounded sole showing incisions therein cut by the pattern blades defining an insole.
Figure 5:
Figure 5 is an enlarged section taken on lines 5—5 of Figure 4.
Figure 12:
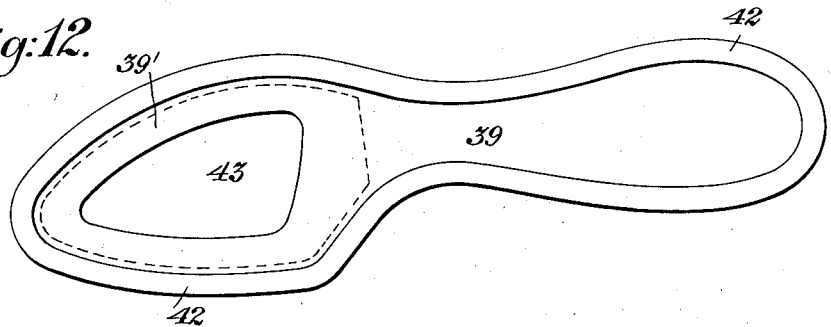
Figure 12 is an inverted plan view of the insole with the upper lasted and secured thereto.
Figure 13:
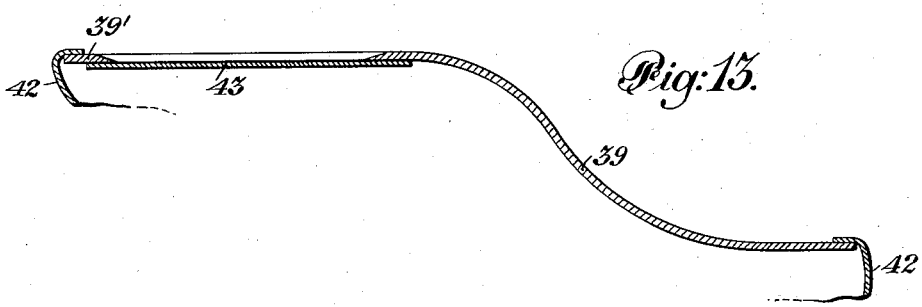
Figure 13 is a longitudinal section taken thru the insole and portions of the attached upper.

Although I have found the foregoing method of producing the rounded and incised sole 30 economical and otherwise of advantage, it will be understood that the sole as it appears in Figures 4 and 5 may be provided in other ways than that above described for the purposes of carrying out the further operations of my improved method, and that the sole may first be rounded and subsequently incised to define the insole portion if desired.

From the description thus far, it will be apparent that if the sole 30 were now to be split within the depth of the incisions 32, the resulting divisions will comprise two sole portions of different sizes and proportions suitable for use as insole and outsole portions, respectively, of a shoe, and that waste marginal portions corresponding to the material lying outside of the incisions and within the depth thereof will also result.

Before performing such splitting operation, however, I prefer to inflex or depress the central ball tread portion of the rounded and incised sole 30 a distance somewhat greater than the depth of the incisions 32. This I accomplish by pressing the sole between the male and female elements, 33 and 34 respectively, of a swage or pressing die, as illustrated in Figure 7.

After removal from the pressing die, the sole is reenforced by a perforate backing strip 36 (see Figure 11), which is formed to complement the depressed portion of the sole and is preferably made of a durable and somewhat flexible composition material. The sole thus backed up is then passed between the rollers 37—37 of a conventional leather splitting machine, the splitting blade 38 of which is positioned to cut within the depth of the incisions 32 and above the bottom of the depressed area 35, so that when the sole has been split its full length, an insole portion 39, perforate centrally of its ball tread portion, and an outsole portion 40, is provided. Waste marginal portions 41 also result from this operation, as will be readily understood.

The insole 39, formed as above, comprises an integral heel portion, a shank portion and a ball portion, the said ball portion having a central opening therein defining a continuous marginal rand 39' extending from the front of one side of the shank around the toe and to the front of the opposite side of the shank.

The insole 39 is next lasted to the upper 42 of the shoe to which it is secured by any of such special adhesives as are well-known in this art, or by other suitable means, preliminary to which a patch 43 may be removably pasted to cover the perforate portion of the insole.

Figure 14:
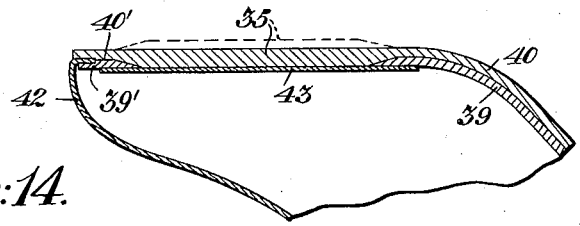
Figure 14 is a longitudinal section illustrating the ball tread portion of the shoe with the outsole assembled thereto.
Figure 15:
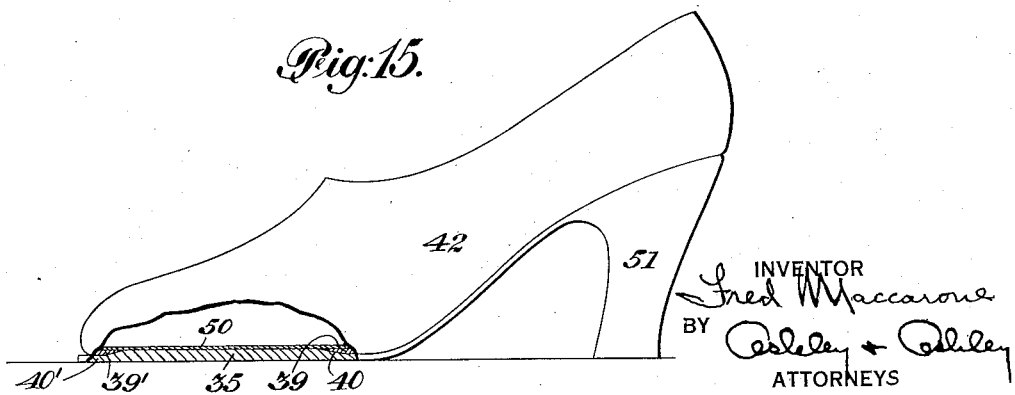
Figure 15 is a side elevation of a completed shoe, shown partly in section to reveal the finished relationship of the sole portions.

The outsole 40 is then placed in position over the lasted insole and the depressed portion 35 thereof is forced back into its original normal condition, as illustrated in Figure 14. In this manner a marginal depression 40' is defined on the inner side of the outsole which conforms to the rand 39' and receives the same with the upper attached thereto, whereby the central portion 35 of the inner face of the outsole is disposed flush with the upper surface of the rand.

The remaining steps necessary to complete the shoe are the usual ones consisting in removing the patch 43, assembling the sole lining 50 and affixing a heel 51.

Since the disclosure of the foregoing in my copending application No. 671,109, filed May 15, 1933, I have made valuable improvements in my original method and means which are particularly illustrated in Figures 16 to 19 hereof.

I have found that a plate 60 may be removably substituted for the clamp 28 of the sole rounding machine; that a pattern or template 61 may be substituted for the pattern 20; and that the parts 60 and 61 may be formed so as to depress the central area 35 of the ball portion of the sole in the act of clamping the sole leather in the rounding machine, thus eliminating the swage or pressing die heretofore described.

To accomplish this, I provide the plate 60 with elevated areas 62—62 on its opposite faces, and recess the pattern 61 over the areas 63—63 of its opposite faces to provide complementary die portions for depressing material clamped between them over the central area of the ball portion of the sole a distance slightly greater than the thickness of the insole to be split therefrom. By providing the elevated areas and depressed areas on opposite faces of the parts 60 and 61, respectively, I am enabled to use the same parts for patterning and depressing soles for mated pairs of shoes by merely inverting the plate 60 and pattern 61 in the sole rounding machine.

It will be understood that the sole material 27 is clamped under pressure in the sole rounding machine between the plate 60 and pattern 61, thereby inflexing the sole material over the central area of the ball portion of the sole to be rounded, and that the sole is then rounded in the machine by the blade 29 guided by the side edges of the pattern.

The sole thus formed and rounded may then be reinforced by the perforate backing strip 36 and split in the leather splitting machine above the bottom of its depressed area 35 to provide a rounded outsole and a perforate insole of lesser thickness and equal area.

I have further found that, in the operation of clamping the sole material in the rounding machine, I may also define and initially form an insole of suitable size, smaller than the outsole, by making a plate 60' (Figure 18) of a shape and size corresponding to the insole desired and providing it with a double edged blade 22'. The blade 22' is secured by screws 23' to the plate at the margins thereof and extends perpendicularly from the unelevated face portions of the plate a distance corresponding to the thickness of the insole to be formed. In this manner the plate 60' is used to incise the sole material in much the same manner as the pattern 20 is employed, as heretofore described.

When the plate 60', carrying the blade 22', and the pattern 61 are used together, the sole material is inflexed over the area 35 thereof and the incisions 32 are cut therein to define an insole, all in the act of clamping the sole material in the rounding machine. Subsequently, when the sole has been rounded and split above the depressed area 35 and within the depth of the incisions 32, as previously set forth, the outole portion 40 and complementary perforate insole portion 39 result. Thereafter, the upper may be affixed to the insole and the outsole assembled thereto as above described to provide a finished shoe.

In this manner, I have provided a very simple and inexpensive method and means for producing my improved complementary outsole and insole members without adding to the number of operations ordinarily necessary for their production, and with the further advantages of minimized waste and insured perfection of sizing.

Although I have described the outsole as being assembled in its original relation to the insole, it is obvious that the overlasted portions of the upper are interposed between the sole layers at their margins. Also it is an advantage of my improved method in quantity production that the sole portions are so accurately formed they may be freely interchanged, if desired, with others of the same size and style, an insole split from one outsole fitting satisfactorily with another outsole from which a similar insole has been split.

Many modifications in the method and means here taught will become apparent from this disclosure to those skilled in the art to which this invention relates and I desire, therefore, to have the foregoing considered merely illustrative of my invention as defined in the here appended claims which are restricted to the specific method improvement, other claims based on matter here disclosed appearing in my copending applications Serial Nos. 671,109, 730,179 and 749,562, filed May 15, 1933, June 12, 1934 and October 23, 1934, respectively.

I claim:

1. In shoe making, the method of providing an outsole and a complementary insole from a single thickness of material which consists in first depressing a sheet of sole material over a predetermined area corresponding to the central area of the ball portion of a sole to be rounded therefrom, then rounding a sole from said sheet in relation to said area, then splitting the rounded sole above said depressed area to obtain a perforate insole therefrom, and then restoring the sole to its normal undepressed condition.

2. In shoe making methods, that improvement which includes depressing a sheet of sole material over a predetermined area corresponding to the central area of the ball portion of a sole to be rounded therefrom, then rounding a sole from said sheet in relation to said area, then splitting the rounded sole above said depressed area to obtain a perforate insole therefrom, lasting a shoe upper to said insole in secured relation, replacing the sole in its original relation to the insole and securing it thereto, and restoring the sole to its normal undepressed condition.

3. In shoe making, the method of providing an outsole and a complementary insole which includes depressing a sheet of sole material over a predetermined area corresponding to the central area of the ball portion of a sole to be rounded therefrom and forming incisions in the sheet to defie margins of an insole, then rounding a sole from said sheet in relation to said area and said incisions, then splitting the sole above the depressed area thereof and within the depth of said incisions to obtain a perforate insole therefrom, and then restoring the sole to its normal undepressed condition.

4. In shoe making, the method of providing an outsole and a complementary insole from a single thickness of material which consists in clamping a sheet of sole material between die elements whereby the sheet is depressed over a predetermined area corresponding to the central area of the ball portion of a sole to be rounded therefrom, then, while the sheet is so clamped, rounding a sole from said sheet in relation to said area, then splitting the sole above the depressed area thereof to obtain a perforate insole therefrom, and then restoring the sole to its normal undepressed condition.

5. In shoe making, the method of providing an outsole and a complementary insole from a single thickness of material which consists in clamping a sheet of sole material between two plates, one of said plates comprising a rounding pattern, and said plates being formed to comprise cooperating die elements whereby the sheet is depressed over a predetermined area corresponding to the central area of the ball portion of a sole to be rounded therefrom, then, while the sheet is so clamped, rounding a sole from said sheet in relation to said area, then splitting the sole above the depressed area thereof to obtain a perforate insole therefrom, and then restoring the sole to its normal undepressed condition.

6. In shoe making, the method of providing an outsole and a complementary insole from a single thickness of material which consists in clamping a sheet of sole material between two plates, one of said plates carrying a blade whereby incisions defining an insole are formed in said sheet, and said plates being formed to comprise cooperating die elements whereby the sheet is depressed over a predetermined area corresponding to the central area of the ball portion of a sole to be rounded therefrom, then, while the sheet is so clamped, rounding a sole from said sheet in relation to said incisions and said area, then splitting the sole above the depressed area thereof and within the depth of said incisions to obtain a perforate insole therefrom, and then restoring the sole to its normal undepressed condition.

7. In shoe making, the method of providing an outsole and a complementary insole from a single thickness of material which consists in depressing a sheet of sole material over a predetermined area corresponding to the central area of the ball portion of a sole to be rounded therefrom in the act of clamping the material in a sole rounding machine, then, while the sheet is so clamped, rounding a sole from said sheet in relation to said area, then splitting the sole above the depressed area thereof to obtain a perforate insole therefrom, and then restoring the sole to its normal undepressed condition.

8. In shoe making, the method of providing an outsole and a complementary insole from a single thickness of material which consists in depressing a sheet of sole material over a predetermined area corresponding to the central area of the ball portion of a sole to be rounded therefrom, and forming incisions in said material defining margins of an insole, all in the act of clamping the material in a sole rounding machine, then, while the sheet is so clamped, rounding a sole from said sheet in relation to said area and said incisions, then splitting the sole above the depressed area thereof and within the depth of said incisions to obtain a perforate insole therefrom, and then restoring the sole to its normal undepressed condition.

9. In shoe making, the method of providing an outsole and a complementary insole from a single thickness of material which consists in first temporarily depressing a sheet of sole material over a predetermined area corresponding to the central area of the ball portion of a sole to be rounded therefrom, then rounding a sole from said sheet in relation to said area, then, while the material is so depressed, splitting the rounded sole above said depressed area to obtain a perforate insole therefrom.

10. In shoe making, the method of providing an outsole and a complementary insole which includes temporarily depressing a sheet of sole material over a predetermined area corresponding to the central area of the ball portion of a sole to be rounded therefrom and forming incisions in the sheet to define margins of an insole, then rounding a sole from said sheet in relation to said area and said incisions, then, while the material is still depressed, splitting the sole above the depressed area thereof and within the depth of said incisions to obtain a perforate insole therefrom.

FRED MACCARONE.